No. 12,502. REISSUED JULY 10, 1906.

G. C. BOURNE.

PISTOL GRIP.

APPLICATION FILED MAR. 16, 1905.

Witnesses

Roy D. Tolman.

Penelope Comberbach.

Inventor

George C. Bourne.

By Rufus B. Fowler

Attorney

THE NORRIS PETERS CO., WASHINGTON, D. C.

UNITED STATES PATENT OFFICE.

GEORGE C. BOURNE, OF WORCESTER, MASSACHUSETTS, ASSIGNOR TO MARY ELIZABETH JOHNSON, OF FITCHBURG, MASSACHUSETTS, EXECUTRIX OF IVER JOHNSON, DECEASED.

PISTOL-GRIP.

No. 12,502. Specification of Reissued Letters Patent. Reissued July 10, 1906.

Original No. 759,415, dated May 10, 1904. Application for reissue filed March 16, 1905. Serial No. 250,489.

*To all whom it may concern:*

Be it known that I, GEORGE C. BOURNE, a citizen of the United States, residing at Worcester, in the county of Worcester and Commonwealth of Massachusetts, have invented a new and useful Pistol-Grip, of which the following is a specification.

This invention relates to an attachment for revolvers or similar firearms; and the especial object of this invention is to provide a better-shaped gripping-surface for the hand of the user, which will insure the pistol being held in the same position each time it is grasped by the hand, and which will also be so constructed as to prevent the weapon from being knocked out of or displaced from the hand of the user.

To these ends this invention consists of the pistol-grip as an article of manufacture and of the combination of parts therewith, as hereinafter described, and more particularly pointed out in the claims at the end of this specification.

Figure 1:
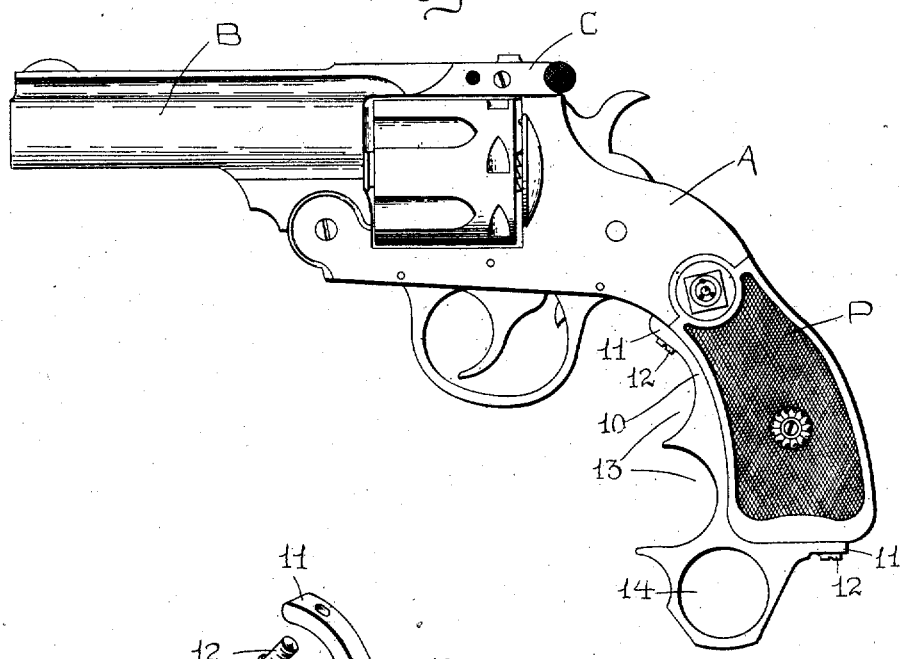
Figure 2:
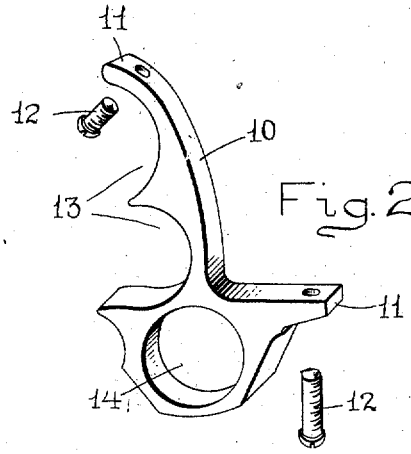

In the accompanying drawings, Figure 1 is a side view of a pistol provided with a pistol-grip attachment constructed according to this invention, and Fig. 2 is a perspective view of the attachment and of the screws for securing the same in place.

In ordinary revolver constructions which are now most extensively placed upon the market the pistol-butts are comparatively short, so that when the pistol is in position to be fired the pistol-butt will not be long enough to easily receive more than the two middle fingers of the user. In practice it has been found that this gives a comparatively insecure grip, so that in nearly all revolver practice the tendency of the lift or kick of the pistol is to cause overshooting. Moreover, even in the better classes of revolvers, the pistol-butts are usually faced with polished material—such, for example, as mother-of-pearl, hard rubber, &c.—which may be comparatively slippery, so that the pistol can be readily knocked out of the hand or may even be dropped accidentally. To overcome these objections, I have provided a form of pistol-grip which will give a long enough gripping-surface to be engaged by the whole hand of the user, while at the same time the gripping attachment is provided with a ring or opening for receiving the little finger, so that the pistol having once been taken in hand cannot be knocked out of the hand of the user. My gripping attachment also provides convenient means for hanging up the weapon when it is not in use.

Referring to the drawings and in detail, I have illustrated my attachment applied to a breakdown revolver of well-known type.

In the drawings, A designates the frame of the revolver, pivoted on the forward end of which is the barrel B, which is held in normal position by a catch C.

The working parts of the pistol are housed within the frame A, and pivotally mounted at the rear end of the barrel B is the ordinary revolver-cylinder.

The pistol-butt is formed by the panels P, of hard rubber or similar material, clamped upon the butt extension, which extends down from the frame A.

The pistol-butt as herein illustrated is of the ordinary type and is not ordinarily long enough to be engaged by the full hand of the operator.

A gripping attachment constructed according to my invention as herein illustrated comprises a body portion or casting 10, having arms 11 extending from the ends thereof to receive the fastening-screws 12. The face of the attachment is provided with finger-cells 13 for receiving the middle and ring-fingers of the user, and at its lower end it is provided with a closed ring 14 for receiving the little finger.

My gripping attachment may be made of different shapes to conform to different designs of pistol-butts and is intended to be formed from a casting of mild steel or other malleable material, which may be bent or shaped to fit accurately to the pistol-butt.

My pistol-gripping attachments are intended to be kept in stock by gunsmiths or dealers in firearms ready to be applied to the ordinary or commercial types of revolvers.

I am aware that slight changes may be made in practicing my invention by those who are skilled in the art without departing from the scope thereof as expressed in the claims. For example, while my pistol-grip is ordinarily intended to be employed as an attachment to be applied to ordinary firearms now on the market it may, if desired, be manufactured as an integral part of a revolver-framework. I do not wish, therefore, to be limited to the details of construction I have herein shown and described.

What I do claim, and desire to secure by Letters Patent of the United States, is—

1. As an article of manufacture a pistol-grip for revolvers forming an extension along the front side and lower end of an ordinary pistol-butt, with finger-cells for receiving the middle and ring fingers of the user, and a ring for the little finger of the user.

2. As an article of manufacture, a pistol-grip for revolvers forming an extension extending downwardly and forwardly from an ordinary pistol-butt, and having a ring at its lower end for receiving the little finger of the user, and with a space above the ring and behind the revolver-trigger for receiving the middle and ring fingers of the user.

3. As an article of manufacture, a pistol-gripping attachment for revolvers consisting of a substantially L-shaped piece with means for securing the same upon the front side and lower end of a pistol-butt, said gripping attachment having finger-cells for the middle and ring fingers of the user, and a ring for the little finger of the user.

4. As an article of manufacture, a gripping attachment for revolvers consisting of a substantially L-shaped casting 10 shaped to fit onto the front side and lower end of a pistol-butt, and having extending arms 11 for receiving fastening-screws 12, the front of the attachment having finger-cells 13 for the middle and ring fingers of the user, and having a bottom ring 14 for receiving the little finger of the user.

5. In a pistol-grip, the combination with the pistol-butt, of an L-shaped detachable piece rigidly held upon the front and end of the butt, said L-shaped piece extending beyond said end, thereby increasing the gripping-surface, and means for attaching said L-shaped piece to the front and end of the butt.

6. In a pistol-grip, the combination with the pistol-butt, of an integral detachable piece held upon the front and end of the butt and extending beyond said end, said piece comprising two members substantially at right angles, means for attaching one of said members to the front of the butt, and means for attaching the other of said members to the end of the butt.

Dated this 9th day of March, 1905.

GEORGE C. BOURNE.

Witnesses:
RUFUS B. FOWLER,
PENELOPE COMBERBACH.